United States Patent [19]
Henderson et al.

[11] Patent Number: 5,806,016
[45] Date of Patent: Sep. 8, 1998

[54] METHOD FOR DETERMINING THE COURSE OF A MACHINE

[75] Inventors: Daniel E. Henderson, Washington; Karl W. Kleimenhagen, Peoria, both of Ill.

[73] Assignee: Caterpillar Inc., Peoria, Ill.

[21] Appl. No.: 623,236

[22] Filed: Mar. 28, 1996

[51] Int. Cl.[6] .................................................. G01C 21/20
[52] U.S. Cl. ....................... 701/207; 701/202; 701/210; 701/50; 701/26; 340/988; 340/990
[58] Field of Search .................. 701/207, 202, 701/213, 210, 214, 216, 217, 50, 25, 26; 340/988, 990, 995; 37/414; 342/357, 350; 364/142, 144, 474.26, 474.29, 474.36

[56] References Cited

U.S. PATENT DOCUMENTS

| | | | |
|---|---|---|---|
| 4,807,131 | 2/1989 | Clegg | 364/424.01 |
| 4,812,991 | 3/1989 | Hatch | 364/458 |
| 5,058,023 | 10/1991 | Kozikaro | 701/217 |
| 5,184,303 | 2/1993 | Link | 364/449 |
| 5,390,124 | 2/1995 | Kyrtsos | 364/449 |
| 5,430,654 | 7/1995 | Kyrtsos et al. | 364/449 |
| 5,488,559 | 1/1996 | Seymour | 342/342 |
| 5,493,494 | 2/1996 | Henderson | 364/424.07 |
| 5,546,093 | 8/1996 | Gudat et al. | 37/414 |

FOREIGN PATENT DOCUMENTS

| | | |
|---|---|---|
| 268278 | 5/1988 | European Pat. Off. . |
| 572129 | 12/1993 | European Pat. Off. . |
| 2298539 | 9/1996 | United Kingdom . |

*Primary Examiner*—Tan Q. Nguyen
*Attorney, Agent, or Firm*—James R. Yee

[57] ABSTRACT

A method for determining the heading of a machine with respect to the course of the machine is provided. The method includes the steps of determining an initial course of the earthmoving; determining an initial heading of the machine and responsively setting a direction status; and determining the current course of the earthmoving machine. The method further includes the steps of comparing the initial and current courses and responsively updating the direction status.

11 Claims, 5 Drawing Sheets

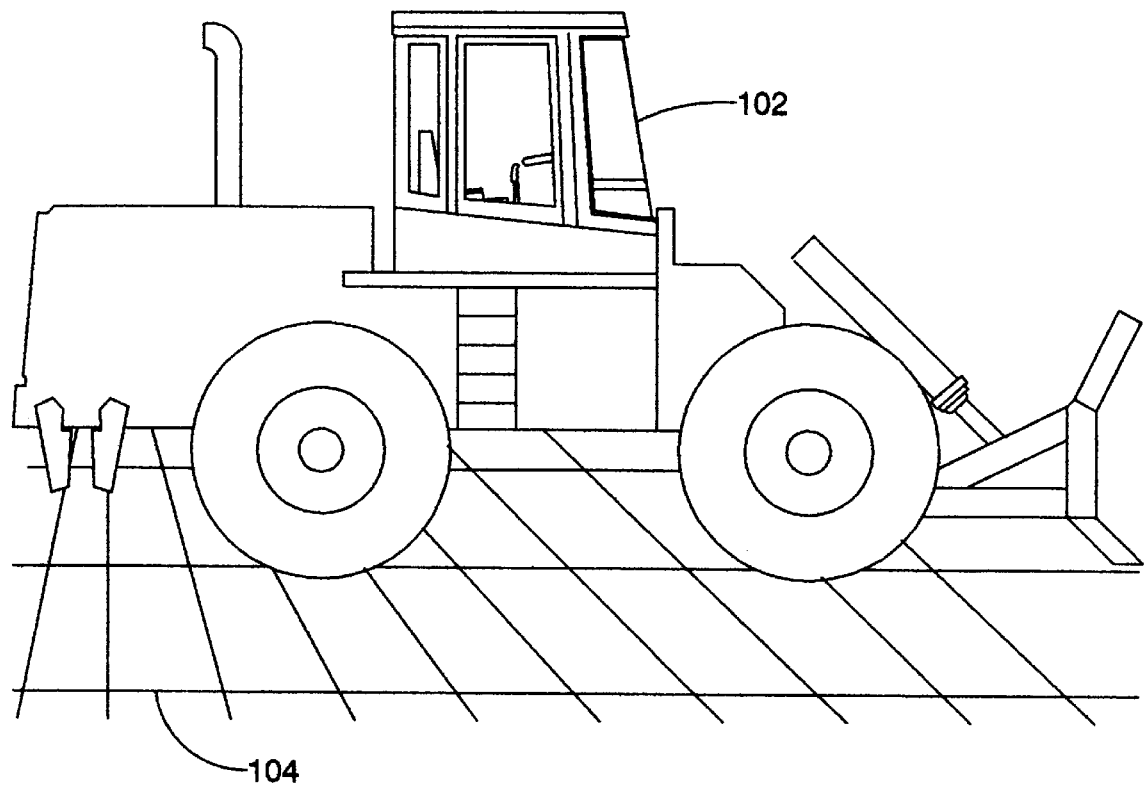
Fig_1_
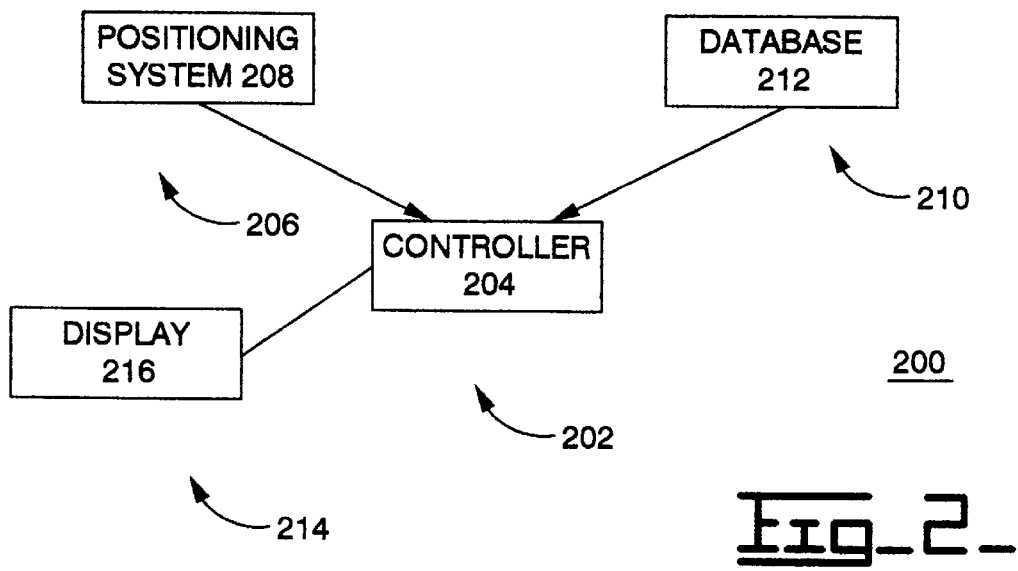
Fig_2_

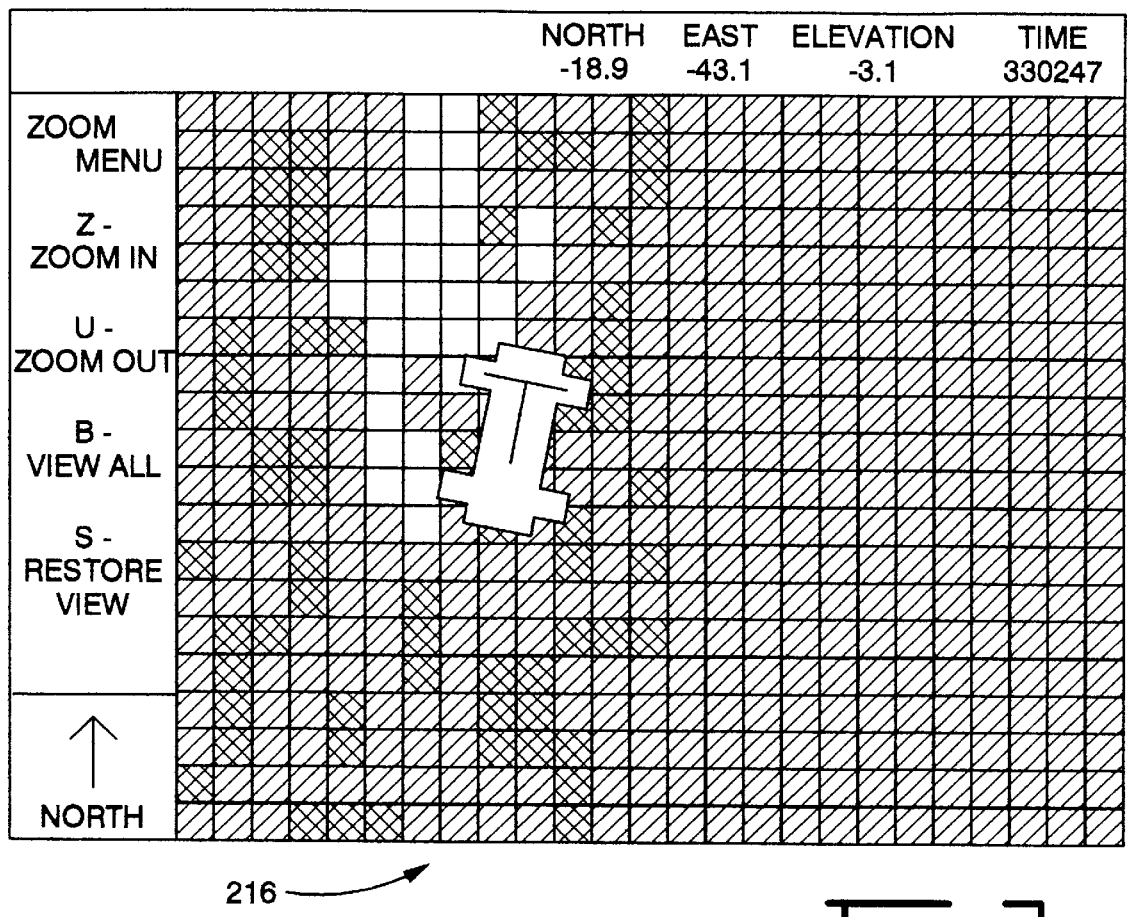
Fig_3_
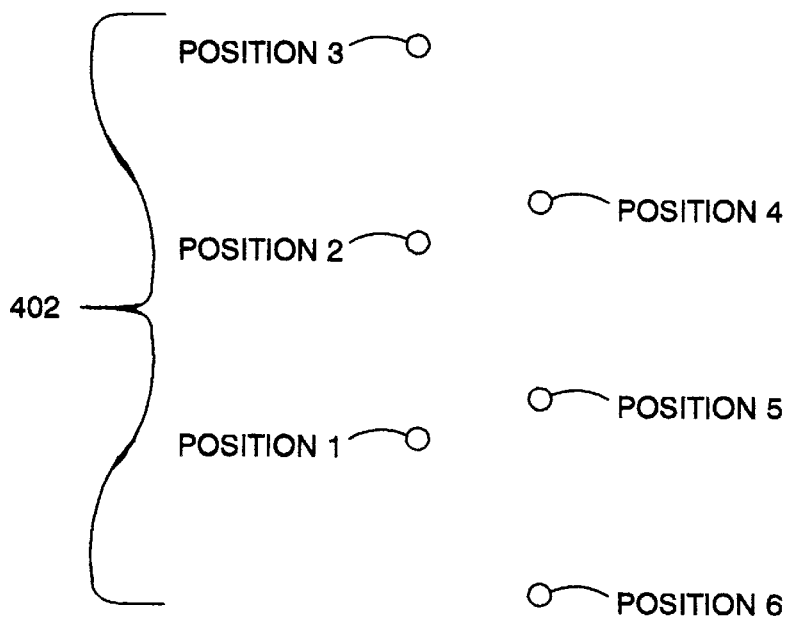
Fig_4_

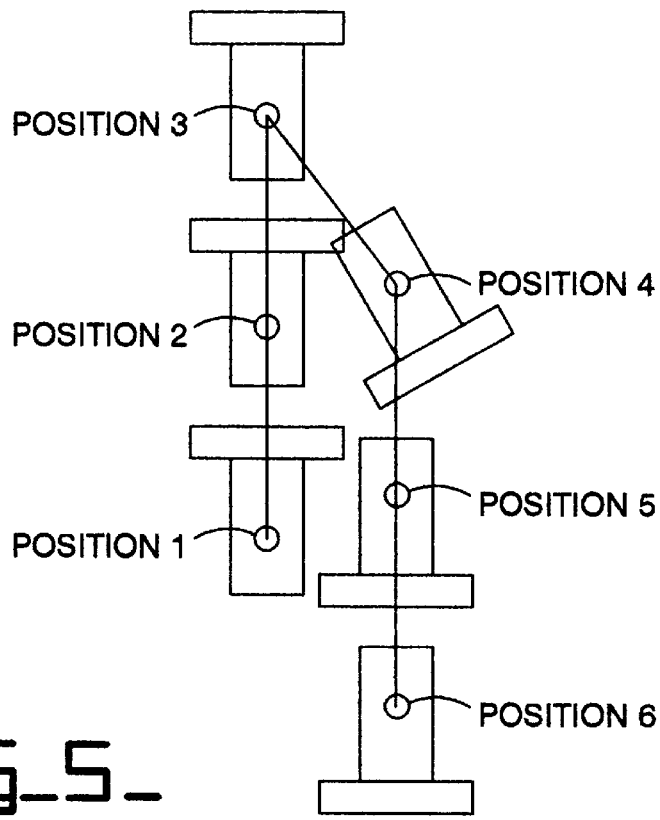
Fig_5_
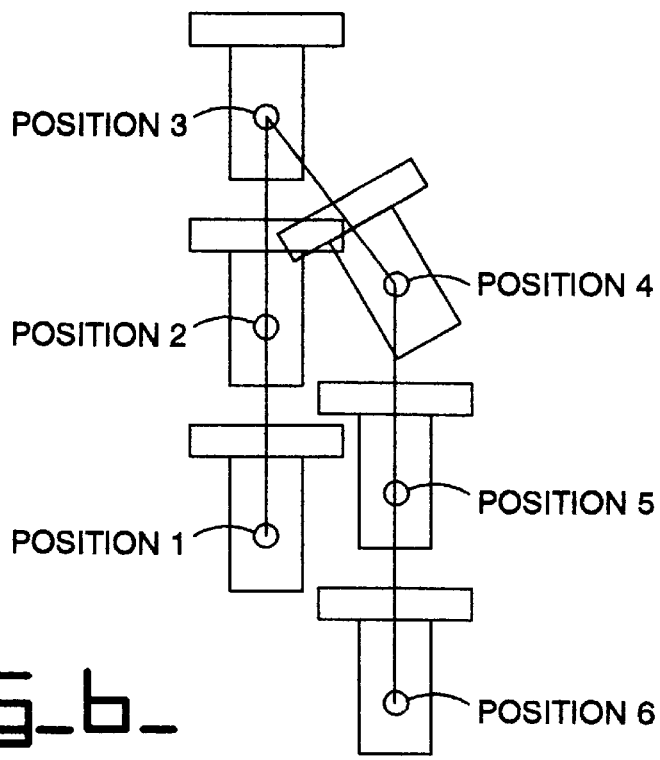
Fig_6_

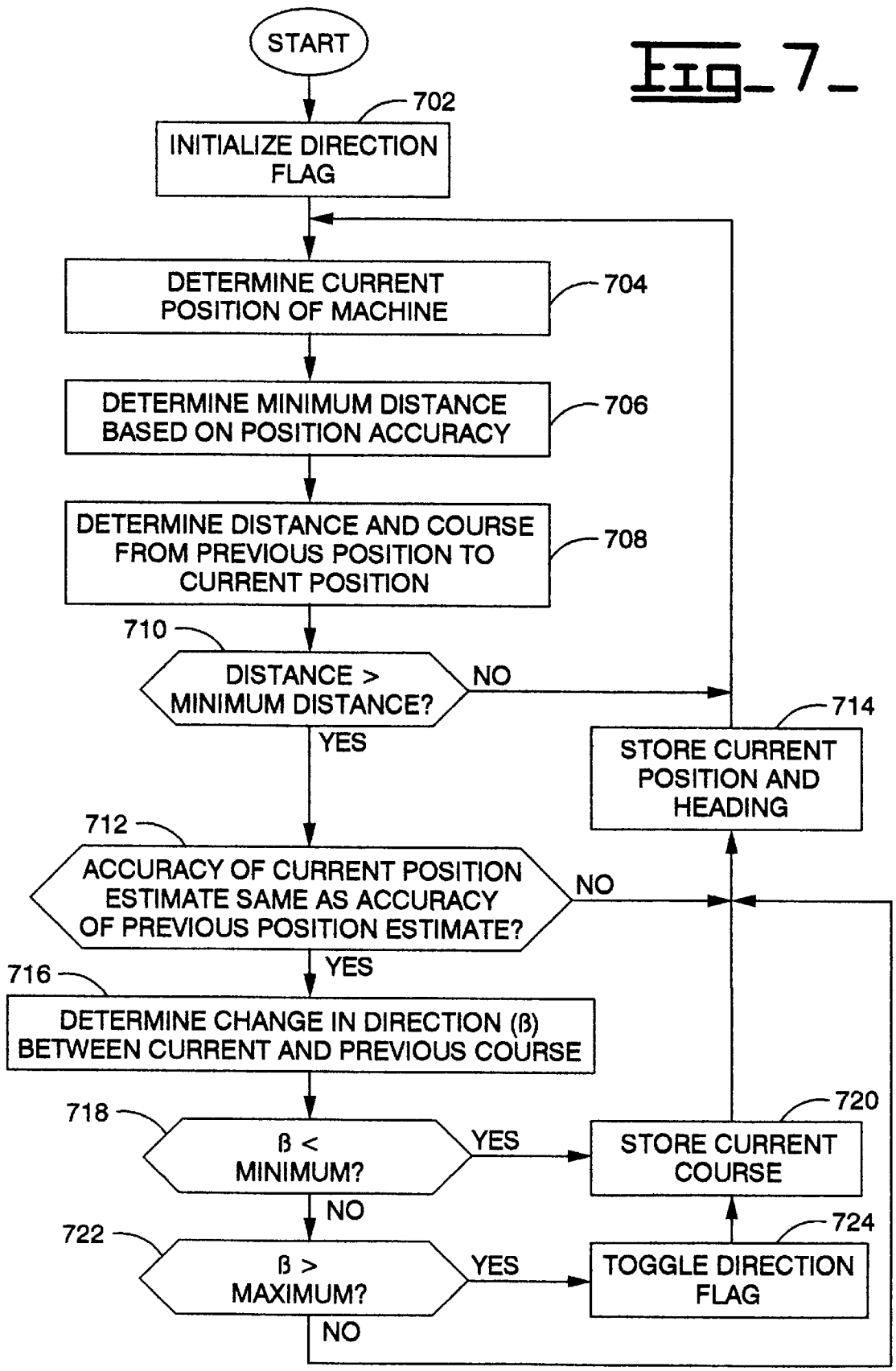

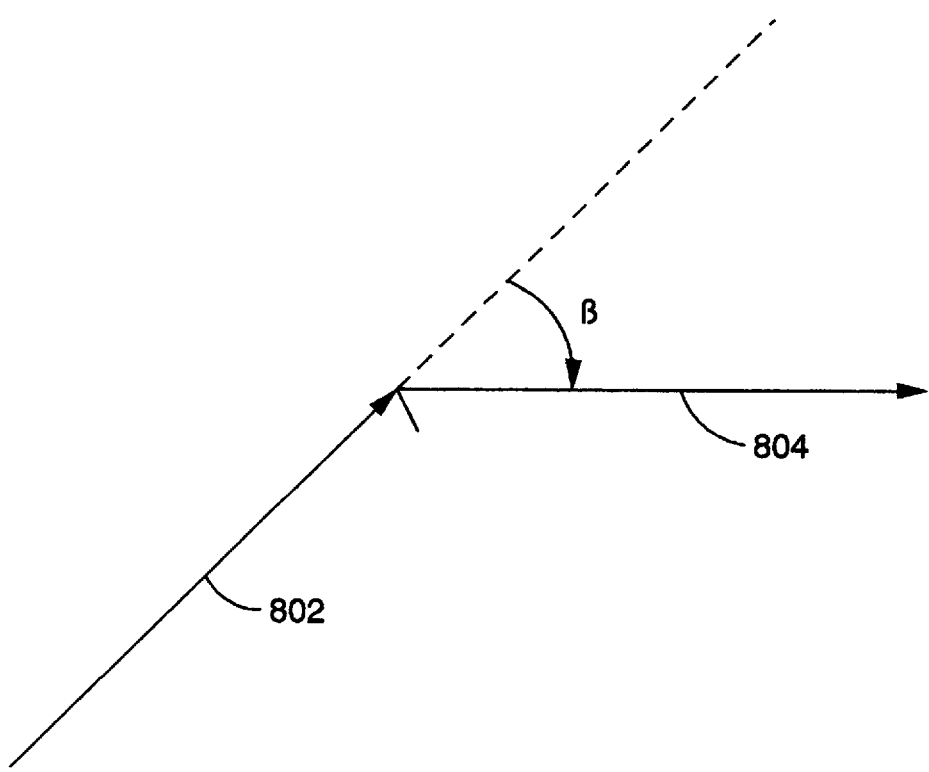
Fig_8_ and display 216 may be used to display a three-dimensional representation of the site surface 104.

METHOD FOR DETERMINING THE COURSE OF A MACHINE

TECHNICAL FIELD

The present invention relates generally to earthmoving machines, and more particularly, to a method for automatically determining the heading of a machine with respect to its course.

BACKGROUND ART

Computer-based aids for earthmoving machines are becoming more common. For example, systems are being developed which utilize the Global Positioning System (GPS) satellites for determining the position of the machine and even the position of an earthmoving tool.

Other systems compile a data base of this position information. The database is continuously updated as the earthmoving machine modifies the site. One such system is disclosed in U.S. Pat. No. 5,493,494 issued on Feb. 20, 1996. The system disclosed in the '494 Patent displays the vehicle on a video screen to aid the operator in operation of the machine.

One of the problems encountered in such systems is determining the correct heading of the machine with respect to its course. The course of the machine refers to the machine's direction of travel. The heading of the machine refers to whether the front of the machine is facing in the direction of travel or facing opposite the direction of travel. The heading of the machine is used to display the correct course and heading of the machine to the operator.

The path of the machine is determined as a function of estimates of the machine's position. Under certain conditions it may be difficult, based solely on the position estimates, to determine whether the machine has turned or reversed directions.

One solution is to include a sensor to detect whether the transmission of the machine is in a forward gear or a reverse gear. However, addition of a sensor strictly for this purpose will add cost to the design and manufacture of the system.

The present invention is aimed at solving one or more of the problems as set forth above.

DISCLOSURE OF THE INVENTION

In one aspect of the present invention, a method for determining the heading of a machine with respect to the course of the machine is provided. The method includes the steps of determining an initial course of the machine and responsively setting a direction status and determining a current course of the machine. The method further includes the step of comparing the initial and current courses of the machine and responsively updating the direction status.

BRIEF DESCRIPTION OF THE DRAWINGS

FIG. 1 is a diagrammatic illustration of an earthmoving machine operating on a work site;

FIG. 2 is a block diagram of an apparatus for performing the present invention;

FIG. 3 is a diagrammatic illustration of a display screen for use with the present invention;

FIG. 4 is an illustration showing six successive position estimates of the machine;

FIG. 5 is an illustration of one possible series of headings of the machine corresponding to the six position estimates of FIG. 4;

FIG. 6 is an illustration of another possible series of successive headings of the earthmoving machine corresponding to the six position estimates of FIG. 4;

FIG. 7 is a flow diagram illustrating operation of a method for determining the heading of the machine with respect to the course of the machine, according to an embodiment of the present invention; and FIG. 8 is a diagrammatic illustration of two successive courses of the machine.

BEST MODE FOR CARRYING OUT THE INVENTION

With reference to FIG. 1, the present invention provides a method for determining the heading of an earthmoving machine 102 with respect to the course of the machine 102. The course of the machine refers to the machine's direction of travel. The heading of the machine refers to whether the front of the machine is facing in the direction of travel or facing opposite the direction of travel. The heading of the machine is used to display the correct course and heading of the machine to the operator.

The earthmoving machine 102 may be manually, autonomously or semi-autonomously operated to modify the site surface 104. The earthmoving machine 102 is shown in FIG. 1 as a compactor, although other types of earthmoving machines such as track type tractors, motorgraders, or hydraulic excavators may be substituted without departing from the spirit of the invention.

With reference to FIG. 2, the present invention is embodied in an apparatus 200. The apparatus 200 includes a calculating means 202 for determining and updating the direction status of the earthmoving machine 102, as discussed below. In the preferred embodiment, the calculating means 202 includes a microprocessor-based controller 204.

A positioning means 206 determines the position of the machine with respect to either a global reference system or a local reference system. In the preferred embodiment, the positioning means 206 includes a positioning system 208. The positioning system 208 may include any suitable positioning system, for example, a Global Positioning System (GPS), a laser plane based system or any other suitable system or combination thereof. The positioning system 208 may also include additional sensors (not shown) to enhance the accuracy of the position estimate, for example, an ultrasonic sensor located on the machine 102.

A display means 214 receives relevant information about the earthmoving machine 102 and the site surface 104 and displays the information on a display 216. For example, with respect to FIG. 3, the display 216 may be used to display the position and heading of a compactor and also a coverage monitor of the site surface 104.

As discussed below, the calculating means 202 determines the heading of the machine 102 with respect to its course. Information relating to the position and heading of the earthmoving machine 102 is stored in a storage means 210. Preferably, the storage means 210 includes a database 212.

A suitable system for determining the x, y and z position of a surface and storing the elevations is disclosed in U.S. Pat. No. 5,493,494 issued on Feb. 20, 1996 which is incorporated herein by reference.

It should be noted, however, that although the figures illustrate a compaction machine and a coverage monitor, other earthmoving machines and information related to the site may alternately be shown. For example, the display 216 may be used to illustrate the position and heading of a track type tractor and a 3-dimensional representation of the site surface 104.

With reference to FIGS. 4–6, in the preferred embodiment the present invention is used in conjunction with the display means 214. The present invention includes a method for determining the heading of the machine with respect to its course. In the preferred embodiment, the heading of the earthmoving machine 102 is represented by a direction flag or direction status flag. The direction status flag has two states: F and R. If the direction status of the earthmoving machine 102 is equal to F then the front of the machine 102 is pointed in the direction of its travel. If the direction flag is equal to R then the front of the machine 102 is pointed in the direction opposite of travel. The direction flag is used to correctly display the position and heading of the machine 102.

In FIG. 4, six successive position estimates 402 as determined by the positioning system 208 are illustrated. As shown in FIG. 5, the earthmoving machine 102 is traveling from position 1 toward position 3 and the earthmoving machine 102 is facing in the direction of travel. However, when the earthmoving machine 102 reaches the next position estimate, position 4, the correct heading of the earthmoving machine 102 with respect to its direction of travel is unknown. There are two possibilities as illustrated by FIGS. 5 and 6. In FIG. 5, the earthmoving machine 102 has turned and the heading of the earthmoving machine 102 remains the same, i.e. the front of the machine is facing in the direction of travel. As shown in FIG. 6, the second possibility is that the machine has now reversed its direction of travel and is now moving backwards, thus its heading has changed, i.e., the front of the machine is now pointed opposite the direction of travel.

With reference to FIG. 7, a flow diagram illustrating operation of the apparatus 200 is shown. In a first control block 702, a direction flag is initialized. In the preferred embodiment, the direction flag is initially set to F. The operator of the earthmoving machine 102 may toggle the flag via a provided input button if the assumption is incorrect.

In a second control block 704, the current position of the earthmoving machine 102 is determined from the positioning system 208. In one embodiment, the position of the earthmoving machine 102 is received from a GPS receiver (not shown). The GPS receiver also produces an estimate of the accuracy of the position estimate.

In a third control block 706, a minimum distance required for the earthmoving machine 102 to have moved from the last position estimate before the heading is updated is determined based on the accuracy of the position estimate. This ensures that the earthmoving machine 102 has moved far enough from its previous location to make a useful estimate of course.

In a fourth control block 708, the distance between the current position and the previous position of the earthmoving machine 102 is determined. Additionally, the course of the earthmoving machine 102 is determined.

In one embodiment, the current course of the machine 102 is determined as the vector from the previous position to the current position. In another embodiment, the course of the earthmoving machine 102 is received from the GPS receiver.

In a first decision block 710, if the distance between the current position and the previous position is not greater than the minimum distance required, then control proceeds back to the second control block 704. However, if the distance traveled is greater than the required minimum distance, then control proceeds to a second decision block 712.

In the second decision block 712, if the accuracy of the current position estimate is not the same as the accuracy of the previous position estimate, then control proceeds to a fifth control block 714. In the fifth control block 714, the current heading is determined as a function of the course and direction flag and the current GPS position and heading is stored. Control then proceeds back to the second control block 704.

If in the second decision block 712 the accuracy of the current position estimate is the same as the accuracy of the previous position estimate, then control proceeds to a sixth control block 716. In the sixth control block 716, the change in direction (β) between the current and previous courses is determined. As shown in FIG. 8, the previous and current courses are represented by vectors 802,804 respectively. The change in direction in the course is represented by β as shown.

In a third decision block 718, if β is less than a predetermined minimum value, then control proceeds to a seventh control block 720. In the seventh control block 720, the current course is stored and control proceeds to the fifth control block 714. If in the third decision block 718, β is not less than the predetermined minimum value, then control proceeds to a fourth decision block 722.

In the fourth decision block 722, if β is greater than the predetermined maximum value, then control proceeds to an eighth control block 724. In the eighth control block 724, the direction flag is toggled and control proceeds back to the seventh control block 720.

If in the fourth decision block 722, β is not greater than the predetermined maximum value, then control proceeds back to the fifth control block 714. Exemplar values for the predetermined minimum and maximum values of β are 30 degrees and 120 degrees, respectively.

Industrial Applicability

With reference to the drawings and in operation, the present invention provides a method for determining the heading of a machine with respect to its course. In the preferred embodiment, the heading of the earthmoving machine 102 is represented by a direction flag. The direction flag has one of two values: F or R. If the direction flag has a value of F then the earthmoving machine 102 is facing in the direction of its travel. If the direction flag has a value of R then the front of the machine 102 is pointed in the direction opposite of travel.

The present invention may be used in a variety of applications, for example, the present invention may be used in a system which displays the current position and heading of an earthmoving machine with respect to the work site.

Other aspects, objects, advantages and uses of the present invention can be obtained from a study of the drawings, disclosure and appended claims.

We claim:

1. A method for determining the heading of a machine with respect to the course of the machine, comprising:
   determining an initial course of the machine;
   determining an initial heading of the machine and responsively setting a direction status;
   determining a current course of the machine; and,
   comparing said initial course and current course of the machine and responsively updating said direction status.

2. A method, as set forth in claim 1, wherein said direction status of the machine has one of first and second values.

3. A method, as set forth in claim 2, wherein said first value is indicative of the front of the machine facing in the direction of travel and said second value is indicative of the front of the machine facing opposite the direction of travel.

4. A method, as set forth in claim 1, wherein the step of comparing the initial course and the current course includes the steps of:

determining an initial course and a current course; and determining the change in direction between the initial and current courses.

5. A method, as set forth in claim 4, wherein the step of comparing the initial course and the current course further includes the step of changing said direction status if said change in direction is greater than a predetermined maximum value.

6. A method, as set forth in claim 1, including the steps of:

determining an initial position of the machine;

determining a current position of the machine;

and wherein the current course of the machine is determined as a function of said initial and current positions.

7. A method, as set forth in claim 6, including the steps of:

setting a previous position and previous course equal to said current position and current course, respectively;

determining a new current position;

determining a new current course based on said previous position and said new current position; and, comparing said previous course and new current course of the machine and responsively updating said direction status.

8. A method for determining the heading of machine with respect to the course of the machine, comprising:

determining an initial position of the machine;

determining an initial course of the machine;

determining an initial heading of the machine and responsively setting a direction status;

determining a current position of the machine;

determining a current course of the machine as a function of said initial and current positions;

determining the change in direction between the initial and current courses and responsively updating said direction status;

setting a previous position and previous course equal to said current position and current course, respectively;

determining a new current position;

determining a new current course based on said previous position and said new current position; and, comparing said previous course and new current course of the machine and responsively updating said direction status.

9. A method, as set forth in claim 8, wherein said direction status of the machine has one of first and second values.

10. A method, as set forth in claim 9, wherein said first value is indicative of the front of the machine facing in the direction of travel and said second value is indicative of the front of the machine facing opposite to the direction of travel.

11. A method, as set forth in claim 10, wherein the step of comparing the initial course and the current course further includes the step of changing said direction status if said change in direction is greater than a predetermined maximum value.

* * * * *